US012812219B2

(12) United States Patent
Kim et al.

(10) Patent No.: US 12,812,219 B2
(45) Date of Patent: Nov. 24, 2026

(54) DISPLAY DEVICE AND OPERATING METHOD THEREFOR

(71) Applicant: SAMSUNG ELECTRONICS CO., LTD., Suwon-si (KR)

(72) Inventors: Byounghyun Kim, Suwon-si (KR); Sanghee Kim, Suwon-si (KR); Younho Choi, Suwon-si (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 18/419,175

(22) Filed: Jan. 22, 2024

(65) Prior Publication Data

US 2024/0205509 A1 Jun. 20, 2024

Related U.S. Application Data

(63) Continuation of application No. PCT/KR2022/011354, filed on Aug. 2, 2022.

(30) Foreign Application Priority Data

Aug. 6, 2021 (KR) ........................ 10-2021-0104199

(51) Int. Cl.
*H04N 21/488* (2011.01)
*G06T 7/40* (2017.01)
(Continued)

(52) U.S. Cl.
CPC ........... *H04N 21/4884* (2013.01); *G06T 7/62* (2017.01); *G06T 7/70* (2017.01); *G06V 10/25* (2022.01);
(Continued)

(58) Field of Classification Search
CPC .. H04N 21/4884; H04N 21/4728; G06T 7/62; G06T 7/70; G06V 10/25; G06V 2201/07
See application file for complete search history.

(56) References Cited

U.S. PATENT DOCUMENTS 6,075,550 A 6/2000 Lapierre
8,264,609 B2 9/2012 Jeon et al.
(Continued)

FOREIGN PATENT DOCUMENTS

JP 2015-196045 A 11/2015
KR 10-0894459 B1 4/2009
(Continued)

OTHER PUBLICATIONS

International Search Report (PCT/ISA/210) issued by the International Searching Authority on Nov. 4, 2022 in corresponding International Application No. PCT/KR2022/011354.
(Continued)

*Primary Examiner* — Yassin Alata
(74) *Attorney, Agent, or Firm* — Sughrue Mion, PLLC

(57) ABSTRACT

An embodiment of the present disclosure relates to a display device including a display, a memory storing at least one instruction, and a processor configured to execute the at least one instruction stored in the memory to receive an image and a closed caption corresponding to the image, detect at least one region of interest (ROI) included in the image by using a neural network, generate at least one integrated region by grouping the at least one ROI into at least one group of adjacent ROIs, determine a closed caption output region among at least one preset candidate closed caption region, based on whether the at least one preset candidate closed caption region overlaps at least one of the at least one ROI
(Continued)

and the at least one integrated region, and control the display to display the closed caption in the closed caption output region.

12 Claims, 11 Drawing Sheets

(51) Int. Cl.

| | |
|---|---|
| ***G06T 7/62*** | (2017.01) |
| ***G06T 7/70*** | (2017.01) |
| ***G06V 10/25*** | (2022.01) |
| ***H04N 21/4728*** | (2011.01) |

(52) U.S. Cl.
CPC ..... *H04N 21/4728* (2013.01); *G06V 2201/07* (2022.01)

(56) References Cited

U.S. PATENT DOCUMENTS

| | | | | |
|---|---|---|---|---|
| 9,602,757 | B2 | 3/2017 | Chaudhri | |
| 2002/0075403 | A1 | 6/2002 | Barone, Jr. et al. | |
| 2007/0252913 | A1 | 11/2007 | Minobe | |
| 2009/0273711 | A1* | 11/2009 | Chapdelaine | G11B 27/34 348/E7.001 |
| 2010/0111392 | A1* | 5/2010 | Valadez | G06V 10/25 382/131 |
| 2013/0127908 | A1 | 5/2013 | Soundararajan | |
| 2018/0047193 | A1* | 2/2018 | Gao | G06T 7/248 |
| 2021/0136459 | A1 | 5/2021 | Mathur | |

FOREIGN PATENT DOCUMENTS

| | | | |
|---|---|---|---|
| KR | 10-2011-0032364 | A | 3/2011 |
| KR | 10-2013-0078663 | A | 7/2013 |
| KR | 10-1390561 | B1 | 5/2014 |
| KR | 10-1435825 | B1 | 8/2014 |
| KR | 10-2018-0059030 | A | 6/2018 |

OTHER PUBLICATIONS

Written Opinion (PCT/ISA/237) issued by the International Searching Authority on Nov. 4, 2022 in corresponding International Application No. PCT/KR2022/011354.

* cited by examiner

DISPLAY DEVICE AND OPERATING METHOD THEREFOR

CROSS-REFERENCE TO RELATED APPLICATIONS

This application is a bypass continuation application of International Application No. PCT/KR2022/011354, filed on Aug. 2, 2022, which is based on and claims priority to Korean Patent Application No. 10-2021-0104199, filed on Aug. 6, 2021, in the Korean Patent Office, the disclosures of which are incorporated by reference herein in their entireties.

BACKGROUND

1. Field

One or more embodiments relate to a display device and an operation method thereof. More particularly, the present disclosure relates to a display device for displaying an image and a closed caption (CC) corresponding to the image and an operation method thereof.

2. Description of Related Art

A display device may receive and display closed captions obtained by transcribing the content of a broadcast program or words of a performer to text, thereby simultaneously providing a viewer with a broadcast screen and the closed captions. These closed captions allow hearing impaired people to view broadcast programs without watching sign language, and general viewers may also refer to closed captions to improve their understandability of broadcasts.

When receiving a broadcast, the display device may receive attribute information about closed captions (e.g., a display position, size, letters, color, background color, font, etc. of the closed captions) and output the closed captions according to the received attribute information. At this time, the display position of the closed captions is not fixed, and is adjusted by a broadcasting company for transmission. However, if the display position of the closed captions does not change in real time, information included in a broadcast screen may be overlapped and obscured by the closed captions. In this way, when important information included on the screen is hidden by the closed captions, information delivery and readability deteriorate.

One or more embodiments may provide a display device and operation method thereof capable of improving delivery and readability of important information included in an image by displaying closed captions to not to obscure the important information.

SUMMARY

According to an aspect of the disclosure, there is provided a display device including a display, a memory storing at least one instruction, or a processor configured to execute the at least one instruction stored in the memory to receive an image and a closed caption corresponding to the image, detect at least one region of interest (ROI) included in the image by using a neural network, generate at least one integrated region by grouping the at least one ROI into at least one group of adjacent ROIs, determine a closed caption output region among at least one preset candidate closed caption region, based on whether the at least one preset candidate closed caption region overlaps at least one of the at least one ROI or the at least one integrated region, or control the display to display the closed caption in the closed caption output region. The processor may be configured to execute the at least one instruction stored in the memory to determine the closed caption output region based on the at least one preset candidate closed caption region that do not overlap at least one of the at least one ROI or the at least one integrated region.

The processor may be configured to execute the at least one instruction stored in the memory to identify at least one object included in the image by using the neural network, or determine the at least one ROI by obtaining information about a location or a size of the at least one object.

The at least one object may include at least one of a text, a person, an animal, or an object.

The processor may be configured to execute the at least one instruction stored in the memory to, when a distance between a first ROI and a second ROI adjacent in a vertical direction among the at least one ROI is less than or equal to a first threshold distance, integrate the first ROI and the second ROI to generate an integrated region.

The processor may be configured to execute the at least one instruction stored in the memory to, when a distance between a first ROI and a third ROI adjacent in a horizontal direction among the at least one ROI is less than or equal to a second threshold distance, integrate the first ROI and the third ROI to generate an integrated region.

The processor may be configured to execute the at least one instruction stored in the memory to detect the at least one ROI based on whether a function for automatically adjusting a display position of the closed caption is activated.

The processor may be configured to execute the at least one instruction stored in the memory to, when a plurality of candidate closed caption regions that do not overlap at least one of the at least one ROI or the at least one integrated region, determine the closed caption output region based on at least one of contiguity information or location information of the plurality of candidate closed caption regions that do not overlap at least one of the at least one ROI or the at least one integrated region.

The processor may be configured to execute the at least one instruction stored in the memory to, when the plurality of candidate closed caption regions that do not overlap at least one of the at least one ROI or the at least one integrated region include a first candidate region, a second candidate region, and a third candidate region, wherein the first candidate region and the second candidate region are located contiguously and the third candidate region is located separately from the first candidate region and the second candidate region, determine the first candidate region and the second candidate region as the closed caption output region.

The processor may be configured to execute the at least one instruction stored in the memory to, when the plurality of candidate closed caption regions that do not overlap the at least one of the at least one ROI or the at least one integrated region include a first candidate region, a second candidate region, and a third candidate region, wherein the third candidate region is located below the first candidate region and the second candidate region, determine the third candidate region as the closed caption output region.

The processor may be configured to execute the at least one instruction stored in the memory to, if all of the at least one preset candidate closed caption regions overlap at least one of the at least one ROI or the at least one integrated region, determine, as the closed caption output region, a region where the closed caption was displayed in an image corresponding to a first frame preceding a second frame corresponding to the image.

The processor may be configured to execute the at least one instruction stored in the memory to, if all of the at least one preset candidate closed caption region overlaps at least one of the at least one ROI or the at least one integrated region, determine the closed caption output region among the at least one preset candidate closed caption region, based on at least one of a size of a portion of each of the at least one preset candidate closed caption region overlapping at least one of the at least one ROI or the at least one integrated region, a position of an overlapping portion, and importance of information displayed in the overlapping portion.

The processor may be configured to execute the at least one instruction stored in the memory to adjust at least one of a color of the closed caption displayed in the closed caption output region and a transparency of a background of the closed caption.

According to an aspect of the disclosure, there is provided an operation method of a display device, the operation method including: receiving an image and a closed caption corresponding to the image; detecting at least one region of interest (ROI) included in the image by using a neural network; generating at least one integrated region by grouping the at least one ROI into at least one group of adjacent ROIs; determining a closed caption output region among at least one preset candidate closed caption region, based on whether the at least one preset candidate closed caption region overlaps at least one of the at least one ROI or the at least one integrated region; and displaying the closed caption in the closed caption output region According to an aspect of the disclosure, there is provided an operation method of a computer readable recording medium having stored a program, the operation method including: receiving an image and a closed caption corresponding to the image; detecting at least one region of interest (ROI) included in the image by using a neural network; generating at least one integrated region by grouping the at least one ROI into at least one group of adjacent ROIs; determining a closed caption output region among at least one preset candidate closed caption region, based on whether the at least one preset candidate closed caption region overlaps at least one of the at least one ROI or the at least one integrated region; and displaying the closed caption in the closed caption output region.

A display device according to an embodiment may detect important information included in an image and display closed captions in regions that do not overlap with the important information, thereby improving information delivery and readability of the important information. Accordingly, this display device may improve the understandability of a broadcast for hearing-impaired or general viewers.

Furthermore, user convenience may be improved by eliminating the need for a user to manually adjust positions of closed captions.

DETAILED DESCRIPTION

Figure 1:
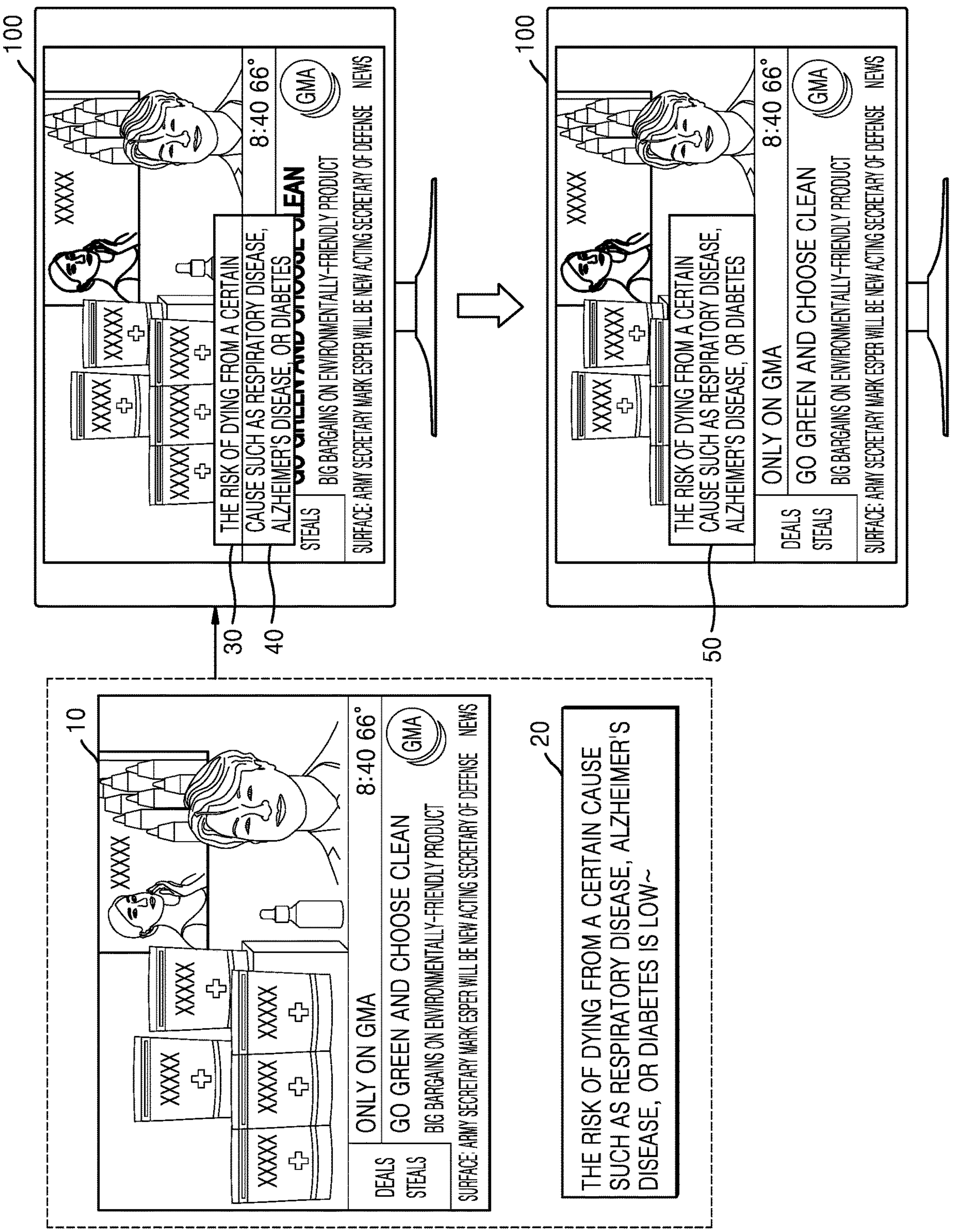
FIG. 1 is a diagram illustrating a display device according to an embodiment.

Terms used in the present specification will now be briefly described and then the present disclosure will be described in detail.

As the terms used herein, general terms that are currently widely used are selected by taking functions according to the present disclosure into account, but the terms may be changed according to the intention of one of ordinary skill in the art, precedent cases, advent of new technologies, or the like. Furthermore, terms may be arbitrarily selected by the applicant, and in this case, the meaning of the selected terms will be described in detail in the detailed description of the present disclosure. Thus, the terms used in the present disclosure should be defined not by simple appellations thereof but based on the meaning of the terms together with the overall description of the present disclosure.

Throughout the specification, when a part “includes” or “comprises” an element, unless there is a description contrary thereto, it is understood that the part may further include other elements, not excluding the other elements. In addition, terms such as “portion”, “module”, etc., described in the specification refer to a unit for processing at least one function or operation and may be implemented as hardware or software, or a combination of hardware and software.

Embodiments will be described more fully hereinafter with reference to the accompanying drawings so that they may be easily implemented by one of ordinary skill in the art. However, the present disclosure may be implemented in different forms and should not be construed as being limited to embodiments set forth herein. In addition, parts not related to descriptions of the present disclosure are omitted to clearly explain the present disclosure in the drawings, and like reference numerals denote like elements throughout.

In an embodiment of the specification, the term “user” refers to a person who controls a system, a function, or an operation, and may include a developer, an administrator, or an installation technician.

In addition, in an embodiment of the specification, an ‘image’ or a ‘picture’ may refer to a still image, or a moving picture composed of a plurality of consecutive still images (or frames), or a video.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. In one or more embodiments, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

FIG. 1 is a diagram illustrating a display device according to an embodiment.

Referring to FIG. 1, a display device 100 according to an embodiment may be an electronic device that displays an image 10 and a closed caption 20 corresponding to the image 10. For example, the display device 100 may be implemented in various forms such as a TV, a mobile phone, a tablet PC, a digital camera, a camcorder, a laptop computer, a desktop, an e-book terminal, a digital broadcasting terminal, a personal digital assistant (PDA), a portable multimedia player (PMP), a navigation device, an MP3 player, a wearable device, etc. Also, the display device 100 may be a stationary electronic device placed at a fixed location or a mobile electronic device having a portable form, and may be a digital broadcasting receiver capable of receiving a digital broadcast. One or more embodiments may be easily implemented in a display device with a large display, such as a TV, but are not limited thereto.

According to an embodiment, the display device 100 may receive the image 10 from an external device or an external server, together with information about the closed caption 20 corresponding to the received image 10.

The display device 100 may display the closed caption on a display based on the received information about the closed caption. For example, the information about the closed caption may include attribute information about the closed caption, and the attribute information about the closed caption may include a size, a display position, a letter color, a background color, a font, etc. of the closed caption.

The display device 100 may decode the attribute information about the closed caption and output the closed caption according to the decoded data. At this time, the display device 100 may output the closed caption in a first region 30 according to the decoded attribute information without separate adjustment of the display position of the closed caption. In this case, as shown in FIG. 1, important information in the image is obscured by the output closed caption. For example, a portion 40 of a lower text region (e.g., an open caption) included in the image may be obscured by the displayed closed caption, and information in the obscured portion of text cannot be conveyed to a viewer.

Additionally, even if a background of the closed caption is displayed in a semi-transparent or transparent manner according to the decoded attribute information, the readability of the corresponding text region 40 overlapped by the closed caption is reduced.

Therefore, according to an embodiment, the display device 100 may detect pieces of important information included in the image 10 and output the closed caption at a display position adjusted so that the detected pieces of important information are not obscured by the closed caption. Accordingly, according to an embodiment, the display device 100 may output the closed caption in a second region 50 corresponding to the adjusted position, and the output closed caption may neither obscure the lower text region included in the image 10 nor obstruct delivery of the information to the viewer via text.

Hereinafter, an operation in which the display device 100 outputs a closed caption without obscuring pieces of important information included in the image will be described in detail with reference to the drawings.

Figure 2:
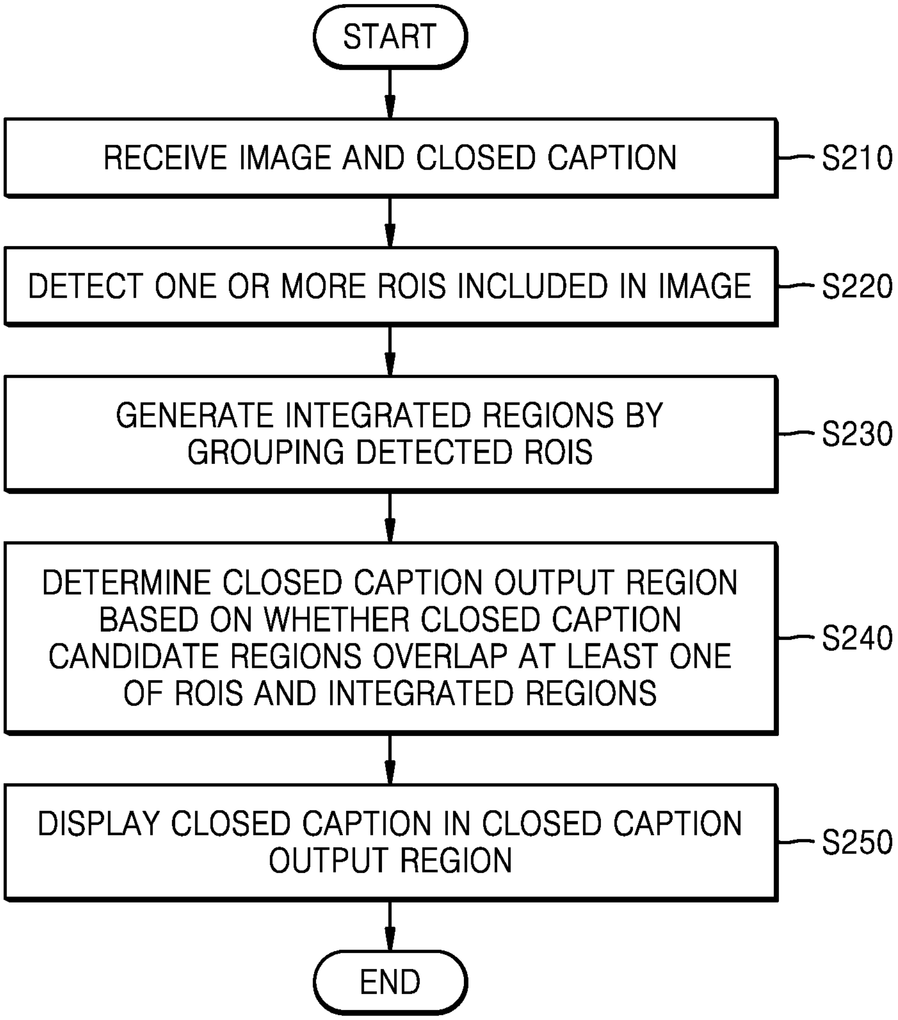
FIG. 2 is a flowchart of an operation method of a display device.

FIG. 2 is a flowchart of an operation method of a display device.

Referring to FIG. 2, according to an embodiment, the display device 100 may receive an image and a closed caption corresponding to the image (S210).

For example, the display device 100 may receive both an image and a closed caption that shows spoken content related to the image as text, and may also receive information about the closed caption. The information about the closed caption may include attribute information about the closed caption (e.g., a display position, size, letters, color, background color, font, etc. of the closed caption), and the display device 100 may output the closed caption according to the attribute information about the closed caption.

Moreover, unlike in the case of an open caption, a user (viewer) of the display device 100 may decide whether to display the closed caption. The user may decide whether to display the closed caption by using a closed caption on/off feature. When a closed caption display function is set to on, the display device 100 may display the closed caption received with the image on the display, and when the closed caption display function is set to off, the display device 100 may not display the closed caption on the display.

In addition, according to an embodiment, the display device 100 may provide a function for automatically adjusting a position of the closed caption. For example, the user may set an automatic closed caption position adjustment function to on or off and accordingly decide whether to automatically adjust the position of the closed caption.

For example, when the automatic closed caption position adjustment function is set to off, the display device 100 may output the closed caption based on a position included in the received attribute information about the closed caption. In this case, the position included in the attribute information about the closed caption may be a position set by an external device or an external server that transmitted the closed caption, but is not limited thereto.

In one or more embodiments, the display device 100 may output the closed caption at a preset position on the display device 100, and in this case, the preset position may be a position set based on a user input.

On the other hand, when the automatic closed caption position adjustment function is set to on, the display device 100 may output the closed caption at a position to as much as possible not obscure an important information region included in the image.

Hereinafter, an example in which the automatic closed caption position adjustment function is set to on will be described.

According to an embodiment, the display device 100 may detect one or more regions of interest (ROIs) included in the image (S220).

In this case, an ROI is a region containing important information in the image, and may be a region including text, people, objects, etc. The display device 100 may use an object detection network to identify objects included in the image and obtain information about a size, location, etc. of the identified objects. A method, performed by the display device 100, of detecting objects included in an image by using an object detection network will be described in detail below with reference to FIG. 4.

For example, the display device 100 may detect open caption letters, logo letters, product name information, performers, etc. included in the image as important information, and set one or more regions including the detected important information to be ROIs. However, the present disclosure is not limited thereto.

According to an embodiment, the display device 100 may generate integrated regions by grouping the detected ROIs (S230).

The display device 100 may integrate adjacent ROIs in a horizontal or vertical direction among the ROIs detected in operation S220. For example, when a distance between adjacent ROIs in the horizontal direction is less than or equal to a first threshold distance, the display device 100 may integrate the ROIs into a single region. In one or more embodiments, when a distance between adjacent ROIs in the vertical direction is less than or equal to a second threshold distance, the display device 100 may integrate the ROIs into a single region.

According to an embodiment, the display device 100 may determine a closed caption output region based on whether candidate closed caption regions overlap at least one of the ROIs and the integrated regions (S240).

In this case, one or more candidate closed caption regions may be regions preset in the display device 100. In addition, even when a portion of a candidate closed caption region overlaps an ROI or an integrated region, the display device 100 may determine that the candidate closed caption region overlaps it.

The display device 100 may determine only one of the regions that do not overlap the detected ROIs and the integrated regions to be a final output region, or determine two or more of the regions as the final output region.

At this time, when the number of regions that do not overlap the detected ROIs and the integrated regions is greater than the number of regions to be determined as the final output region, the display device 100 may determine the final output region according to priority. The display device 100 may assign a higher priority to regions that are located consecutively or a region located in a lower portion of the image.

On the other hand, when all of the candidate closed caption regions overlap the ROIs or integrated regions, the display device 100 may determine the final output region so that the closed caption continues to be displayed in a region in which the closed caption was displayed in a previous frame of the image. In this case, the display device 100 may determine the final output region for outputting the closed caption, based on at least one of a size of an overlapping portion, a position of the overlapping portion, and importance of information displayed in the overlapping portion.

Moreover, the display device 100 may perform operations S220, S230, and S240 over a preset period or whenever an image frame changes. However, the present disclosure is not limited thereto.

According to an embodiment, the display device 100 may display the closed caption in the closed caption output region (S250).

The display device 100 may output the closed caption at a position adjusted so that the closed caption is displayed in the final output region. Accordingly, the displayed closed caption does not obscure important information included in the image.

On the other hand, when the final output region for outputting the closed caption overlaps a detected ROI or integrated region, the display device 100 may display the closed caption by adjusting a letter color of the closed caption, background transparency for the closed caption, etc.

Figure 3:
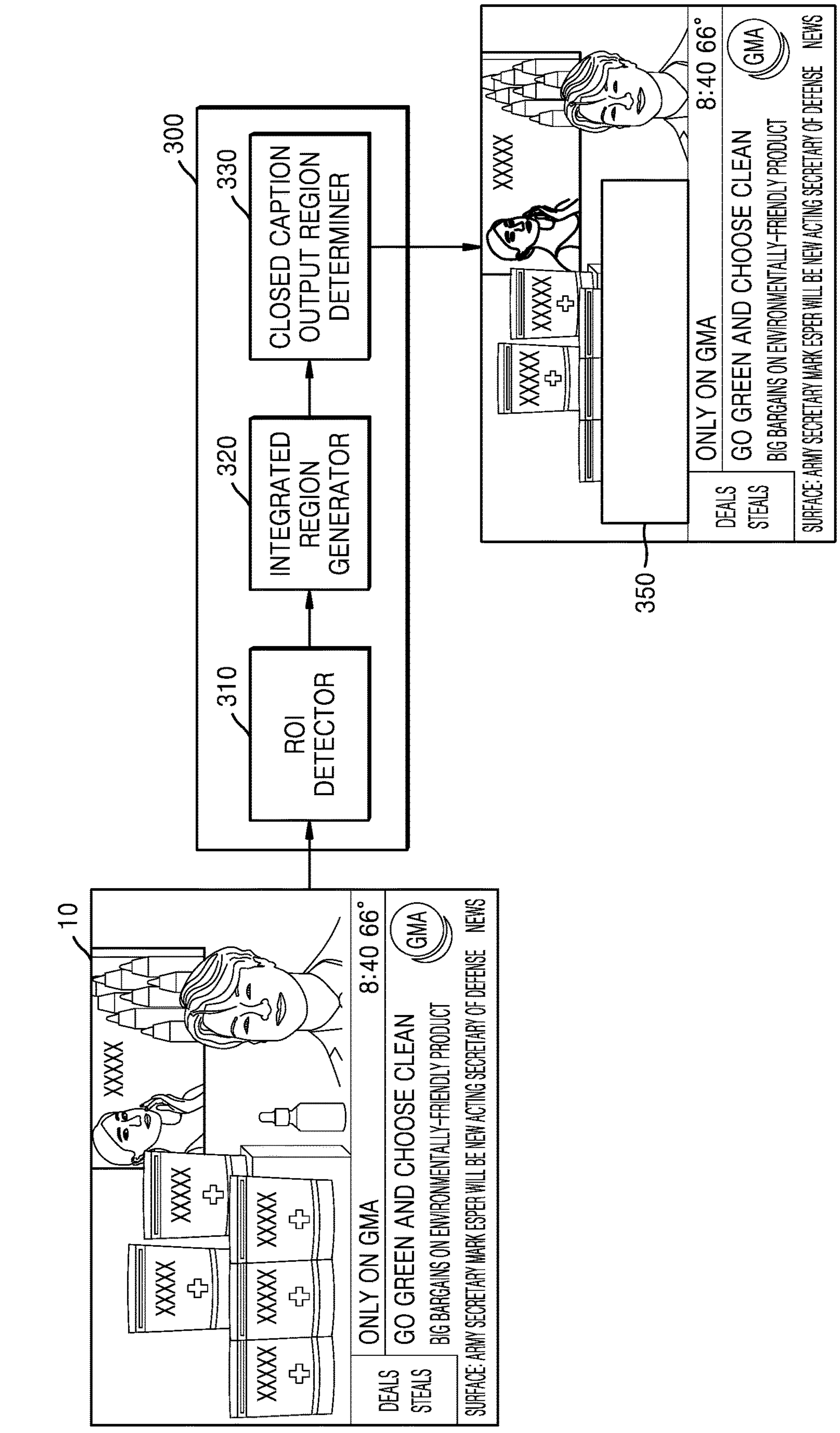
FIG. 3 is a diagram illustrating a configuration of a device (or module) for performing an automatic closed caption position adjustment function, according to an embodiment.

FIG. 3 is a diagram illustrating a configuration of a device (or module) for performing an automatic closed caption position adjustment function, according to an embodiment. A device (or module) 300 for performing an automatic closed caption position adjustment function may be included in a portion of the display device 100 shown in FIG. 1, in a portion of a display device 100 shown in FIG. 10, or in a portion of a display device 1100 shown in FIG. 11.

Referring to FIG. 3, the device (or module) 300 for performing an automatic closed caption position adjustment function, according to the embodiment, may include an ROI detector 310, an integrated region generator 320, and a closed caption output region determiner 330.

The ROI detector 310 may include appropriate logic, circuitry, interface, and/or code that are operable to detect at least one ROI included in an image 10. In this case, an ROI is a region containing important information in the image 10, and may be a region including text, people, objects, etc. The ROI detector 310 may use an object detection network to identify objects included in the image and obtain information about a class, size, and location of the identified objects. The ROI detector 310 may set at least one ROI based on the information about the detected objects. This case will be described in detail with reference to FIG. 4.

The integrated region generator 320 may generate at least one integrated region by grouping at least one ROI into groups of adjacent ROIs. This case will be described in detail with reference to FIG. 5.

The closed caption output region determiner 330 may determine a closed caption output region 350 based on whether one or more preset candidate closed caption regions overlap at least one of the detected ROIs and the integrated regions. This case will be described in detail with reference to FIG. 6.

Figure 4:
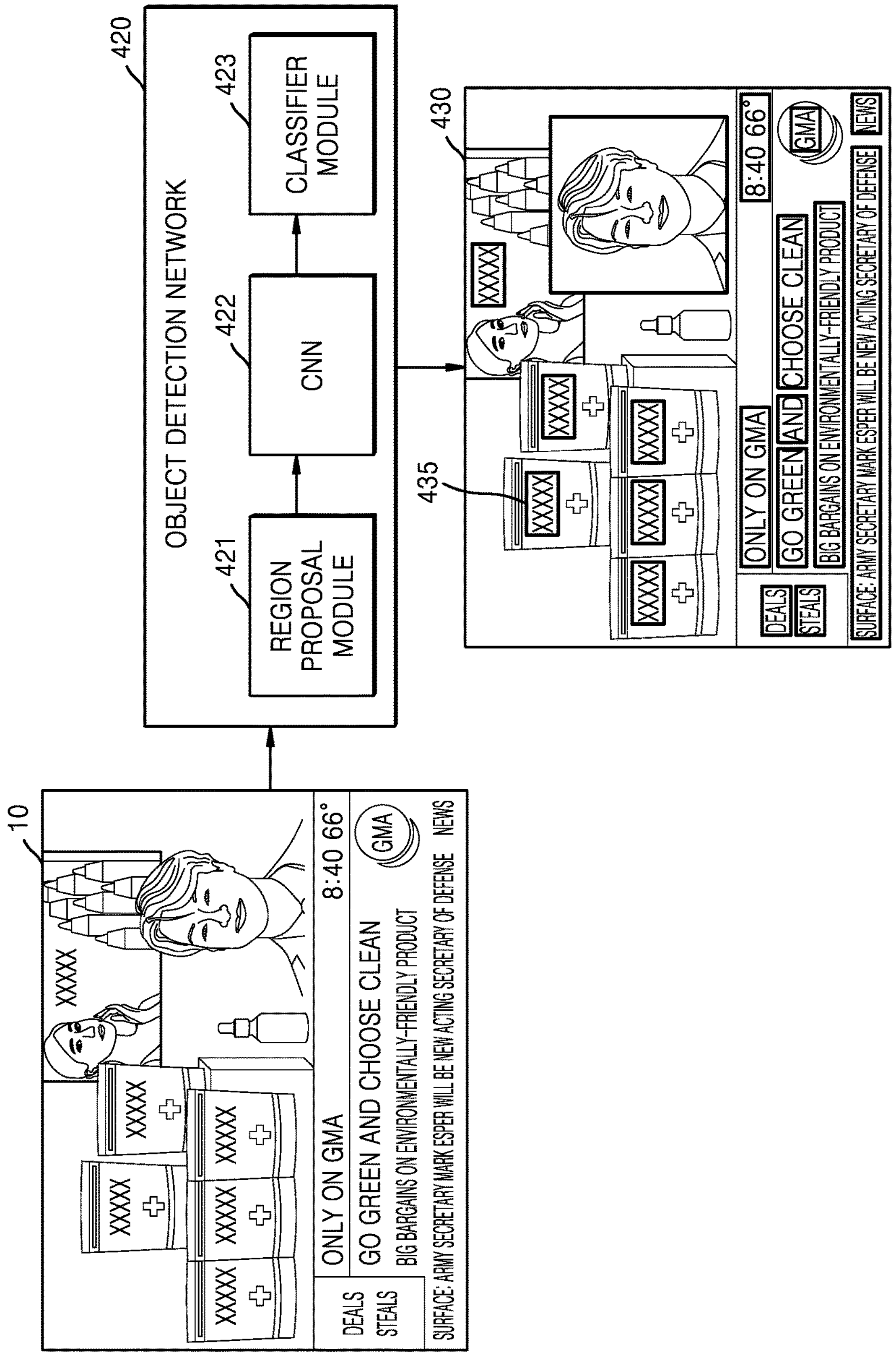
FIG. 4 is a diagram illustrating an object detection network according to an embodiment.

FIG. 4 is a diagram illustrating an object detection network according to an embodiment.

Referring to FIG. 4, an object detection network 420 according to an embodiment may be a neural network that takes an image 10 as an input and detects at least one object included in the image 10. The object detection network 420 may detect one or more objects in the image 10 by using one or more neural networks, and output object information including an object class and an object location corresponding to the one or more detected objects.

Here, object detection includes determining where objects are located in a given image (object localization) and determining which category each object belongs to (object classification). Therefore, object detection network may include three operations: selecting candidate object regions, extracting features from each candidate region, and applying a classifier to the extracted features to classify the candidate object region as a class. Depending on a detection method, post-processing such as bounding box regression may be subsequently used to improve localization performance.

According to an embodiment, the object detection network 420 may be a deep neural network (DNN) with a plurality of internal layers that perform calculations, or a convolution neural network (CNN) consisting of convolutional layers performing convolutions as internal layers, but is not limited thereto.

Referring to FIG. 4, the object detection network 420 according to the embodiment may include a region proposal module 421, a CNN 422, and a classifier module 423.

The region proposal module 421 may extract candidate regions from the image 10. The number of candidate regions may be limited to a preset number, but is not limited thereto.

The CNN 422 may extract feature information from the regions generated by the region proposal module 421.

The classifier module 423 may take the feature information extracted from the CNN 422 as an input and perform classification.

In order for a neural network to accurately output resulting data corresponding to input data, the neural network needs to be trained according to the purpose. In this case, 'training' may mean training the neural network to discover or learn on its own a method of analyzing pieces of input data fed to the neural network, a method of classifying the pieces of input data, and/or a method of extracting features for generating resulting data from the pieces of input data. In detail, through a training process, the neural network may optimize and set weight values therein by being trained using training data (e.g., a plurality of different images). Then, a result is output by learning input data on its own via the neural network having the optimized weight values.

For example, through training, weight values within the object detection network 420 may be optimized so that the object detection network 420 detects at least one object included in the image input to the object detection network 420. At this time, the object detection network 420 may be trained to detect, in the image, important information such as text, people, and objects. For example, the object detection network 420 may be trained to detect open caption letters, logo letters, product name information, performers, etc. included in a broadcast screen as important information. However, the present disclosure is not limited thereto.

Accordingly, the trained object detection network 420 may take an image as an input, detect at least one object included in the image, and output a detection result. For example, the object detection network 420 may detect one or more object regions including open caption letters, logo letters, product names, and performers included in the image.

As shown in FIG. 4, an output image 430 output from the object detection network 420 may include information about an object detected in the image 10. The information about the object may include information about a class of the detected object and a bounding box 435 representing a location of the detected object. However, the information is not limited thereto, and objects detected in the image 10 may be displayed in the output image 430 in various formats.

According to an embodiment, the display device 100 may set object regions detected by the object detection network 420 to be ROIs.

Figure 5:
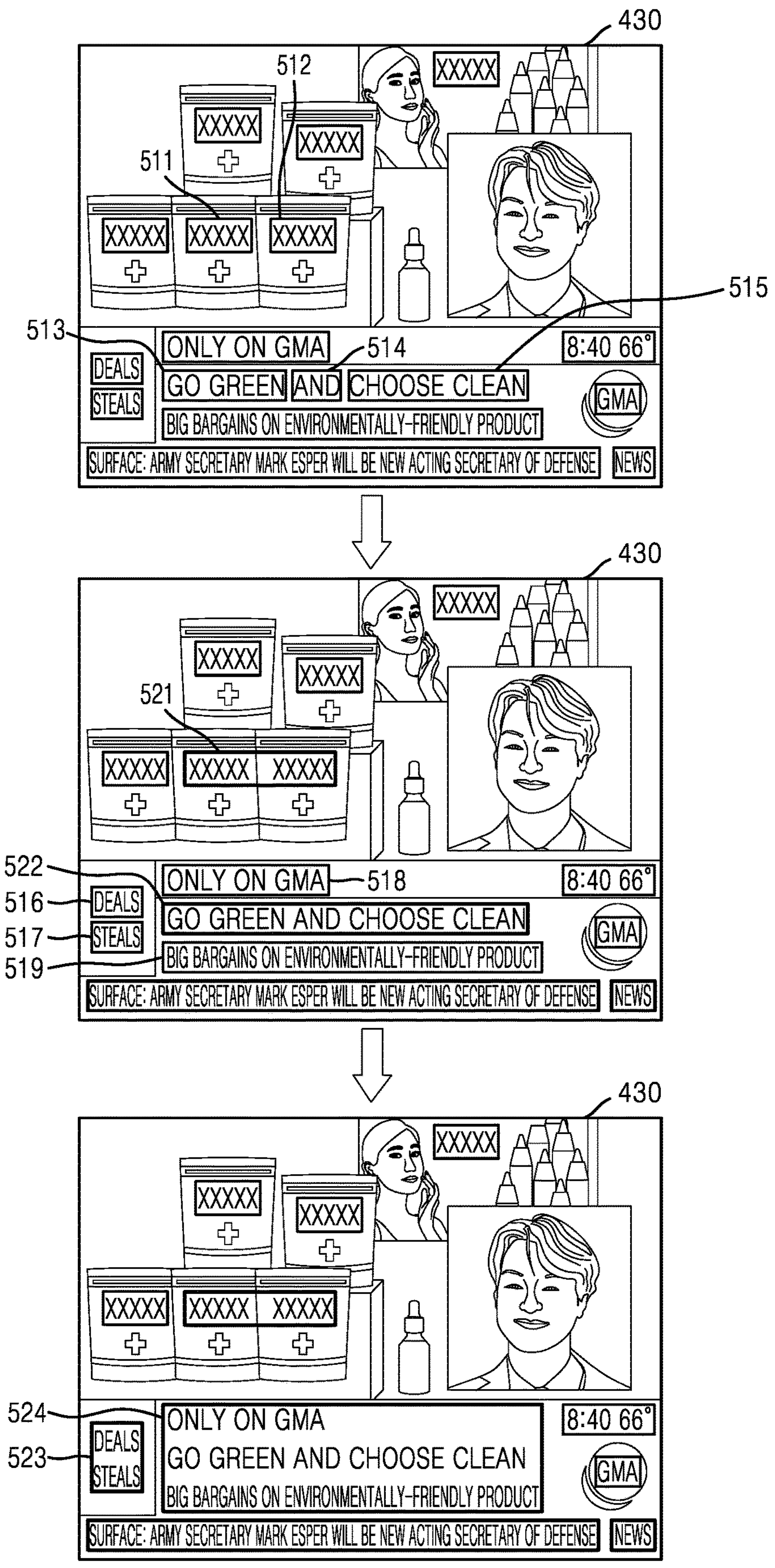
FIG. 5 is a reference diagram for describing an operation in which a display device generates an integrated region, according to an embodiment.

FIG. 5 is a reference diagram for describing an operation in which a display device generates an integrated region, according to an embodiment.

Referring to FIG. 5, the display device 100 may integrate adjacent ROI regions in a horizontal direction (an x-axis direction) among ROIs included in an image. When a distance between adjacent ROIs in the horizontal direction is less than or equal to a first threshold distance, the display device 100 may integrate the ROIs into a single region. For example, when a horizontal distance between a first ROI 511 and a second ROI 512 is less than or equal to the first threshold distance, the first ROI 511 and the second ROI 512 may be integrated into a single region to generate a first integrated region 521. In this case, the horizontal distance between ROIs may include, but is not limited to, a shortest horizontal distance between the ROIs, a distance between centers of the ROIs, a distance between reference points in the ROIs, etc., and the horizontal distance may be determined in various ways.

In addition, when a horizontal distance between a third ROI 513 and a fourth ROI 514 and a horizontal distance between the fourth ROI 514 and a fifth ROI 515 are each less than or equal to the first threshold distance, the third ROI 513, the fourth ROI 514, and the fifth ROI 515 may be integrated into a single region to generate a second integrated region 522.

Furthermore, the display device 100 may integrate adjacent ROIs in a vertical direction (a y-axis direction) among ROIs included in the image. When a distance between adjacent ROIs or between adjacent ROIs and integrated regions in the vertical direction is less than or equal to a second threshold distance, the display device 100 may integrate the ROIs or integrated regions into a single region. For example, when the vertical distance between a sixth ROI 516 and a seventh ROI 517 is less than or equal to the second threshold distance, the sixth ROI 516 and the seventh ROI 517 may be integrated into one region to generate a third integrated region 523. In this case, the vertical distance between ROIs may include, but is not limited to, a shortest vertical distance between the ROIs, a distance between centers of the ROIs, a distance between reference points in the ROIs, etc., and the vertical distance may be determined in various ways.

In addition, when a vertical distance between an eighth ROI 518 and the second integrated region 522 and a vertical distance between the second integrated region 522 and a ninth ROI 519 are each less than or equal to the second threshold distance, the eighth ROI 518, the second integrated region 522, and the ninth ROI 519 may be integrated into one region to generate a fourth integrated region 524.

Moreover, while it has been shown or described with reference to FIG. 5 that adjacency is determined based on a horizontal or vertical distance between ROIs or integrated regions, the present disclosure is not limited thereto, and adjacency between ROIs or integrated regions may be determined based on various other criteria.

Figure 6:
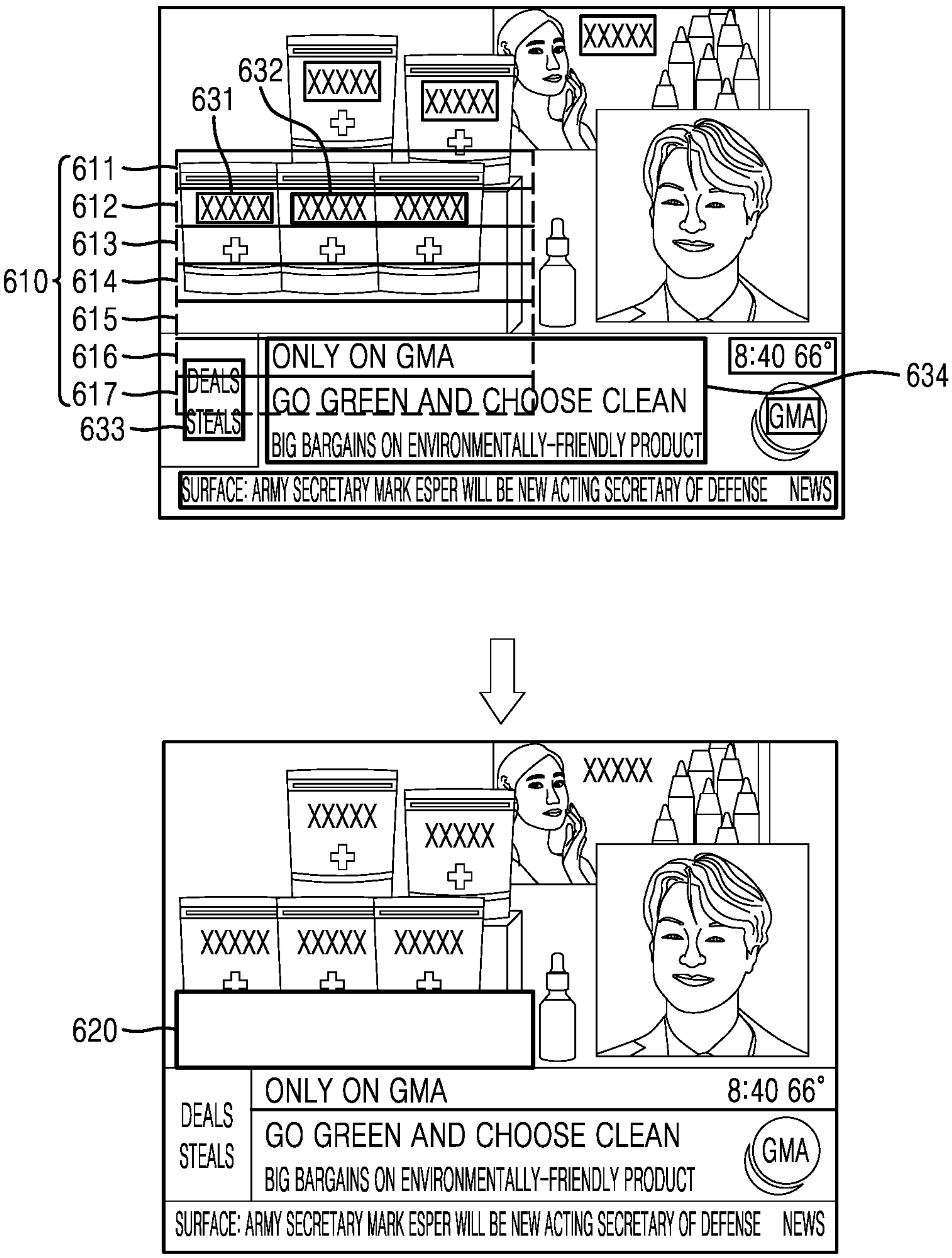
FIG. 6 is a reference diagram for describing an operation in which a display device determines a closed caption output region, according to an embodiment.

FIG. 6 is a reference diagram for describing an operation in which a display device determines a closed caption output region, according to an embodiment.

Referring to FIG. 6, according to an embodiment, the display device 100 may determine a final closed caption output region among one or more candidate closed caption regions based on a location of an ROI or integrated region.

In this case, the one or more candidate closed caption regions may be regions preset in the display device 100 or regions determined based on a user input. In one or more embodiments, the candidate closed caption regions may be variably determined based on a default output position for a closed caption included in received closed caption attribute information.

Referring to FIG. 6, according to an embodiment, candidate closed caption regions may include a first region 611, a second region 612, a third region 613, a fourth region 614, a fifth region 615, a sixth region 616, and a seventh region 617. In addition, while FIG. 6 shows that the first region 611, the second region 612, the third region 613, the fourth region 614, the fifth region 615, the sixth region 616, and the seventh region 617. are regions that are of the same size and are located consecutively, the present disclosure is not limited thereto, and the candidate closed caption regions may be of different sizes and be located separately from each other.

The display device 100 may determine whether each of the one or more candidate closed caption regions overlaps a detected ROI or integrated region. In this case, even when a portion of a candidate closed caption region overlaps an ROI or an integrated region, the display device 100 may determine that the candidate closed caption region overlaps it.

For example, the display device 100 may determine whether each of the first region 611, the second region 612, the third region 613, the fourth region 614, the fifth region 615, the sixth region 616, and the seventh region 617. overlaps an ROI detected in the image or integrated region. As a result of the determination, the second region 612 overlaps a first ROI 631 and a first integrated region 632, and the sixth region 616 and the seventh region 617 each overlap a second integrated region 633 and a third integrated region 634.

On the other hand, the first region 611 and the third region 613, the fourth region 614 to the fifth region 615 do not overlap detected ROIs and integrated regions. The display device 100 may determine a final output region for outputting the closed caption from the candidate closed caption regions (the first region 611 and the third region 613, the fourth region 614 to the fifth region 615) that do not overlap the detected ROIs and the integrated regions.

According to an embodiment, the display device 100 may determine only one of the regions that do not overlap the detected ROIs and the integrated regions to be a final output region, or determine two or more of the regions as the final output region. In this case, when the number of regions that do not overlap the detected ROIs and the integrated regions is greater than the number of regions to be determined as the final output region, the display device 100 may determine the final output region according to priority.

According to an embodiment, the display device 100 may assign a higher priority to regions located consecutively or a region located in a lower portion of the image. For example, when only one region is determined as the final output region, the display device 100 may determine the fifth region 615, which is located in a lowest portion of the image among the first region 611 and the third region 613, the fourth region 614 to the fifth region 615, to be the final output region. In one or more embodiments, when two regions are determined as the final output region, the display device 100 may select the third region 613, the fourth region 614 to the fifth region 615, which are consecutively located regions, among the first region 611 and the third region 613, the fourth region 614 to the fifth region 615, and then determine the fourth region 614 and the fifth region 615, which are located in a lower portion of the image, among the third region 613, the fourth region 614 to the fifth region 615, to be a final output region 620. However, this case is an example, and one or more of the regions that do not overlap the detected ROIs and the integrated regions may be determined as the final output region by using various other criteria and methods.

Figure 7:
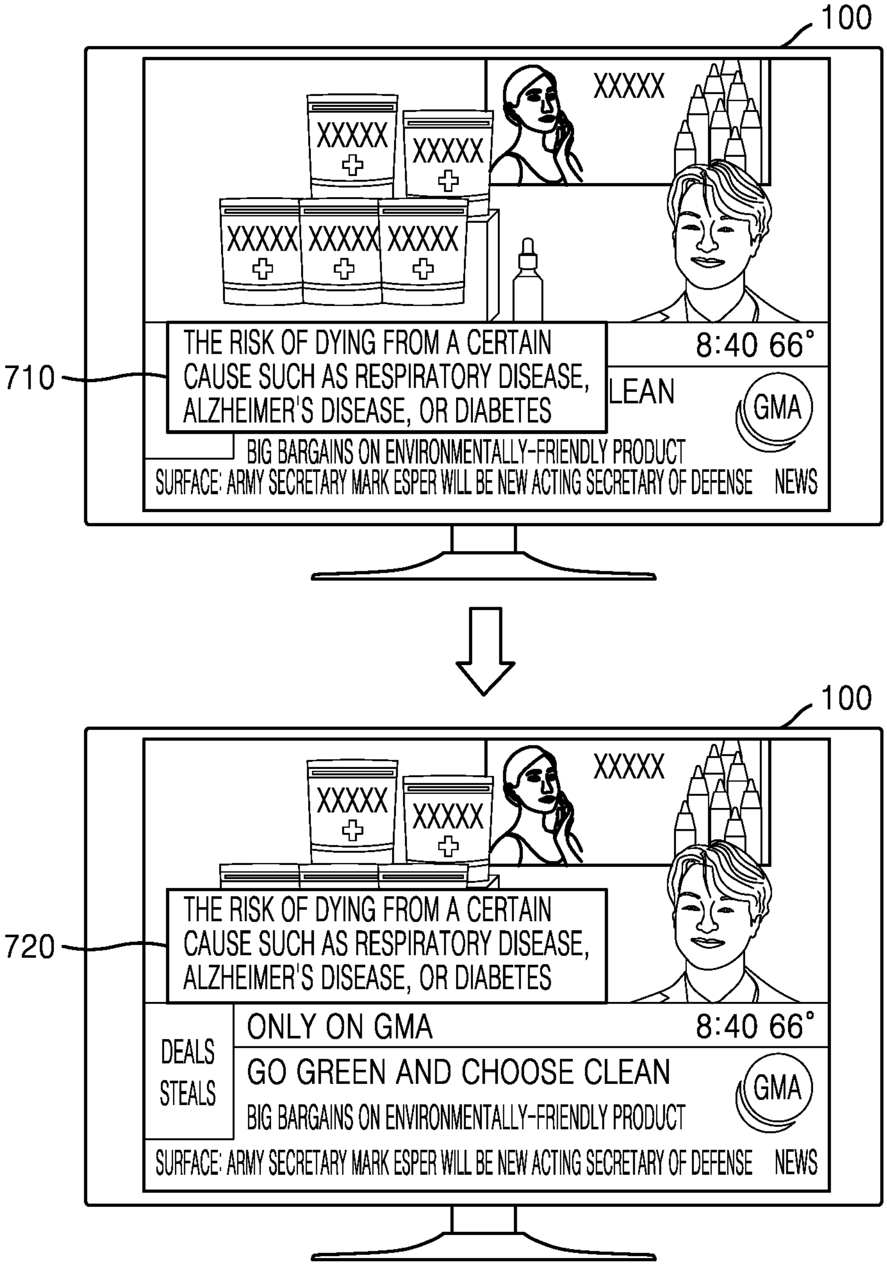
FIG. 7 is a reference diagram for describing an operation in which a display device displays closed captions, according to an embodiment.

FIG. 7 is a reference diagram for describing an operation in which a display device displays closed captions, according to an embodiment.

When a final output region is determined among candidate closed caption regions is determined, the display device 100 may adjust an output position of a closed caption so that the closed caption is displayed in the final output region.

For example, according to an embodiment, when an automatic closed caption position adjustment function is turned off, a closed caption may be displayed in a first region 710 based on a default output position included in closed caption attribute information. As shown in FIG. 7, when the closed caption is displayed at the default output position, important information such as an open caption included in the image is obscured.

On the other hand, when the automatic closed caption position adjustment function is turned on, according to an embodiment, the display device 100 may determine a final output region for the closed caption according to the method shown and described with reference to FIGS. 1 to 6, and then output the closed caption at a position adjusted so that the closed caption is displayed in the final output region. Accordingly, as shown in FIG. 7, the display device 100 may adjust the output position for the closed caption to display the closed caption in a second region 720, and thus, the close caption displayed in the second region 720 do not obscure important information such as the open caption included in the image.

Furthermore, the closed caption may be output in a roll-up manner in the determined final output region. The roll-up method is a method of displaying captions by scrolling up one line at a time. However, the present disclosure is not limited thereto.

Figure 8:
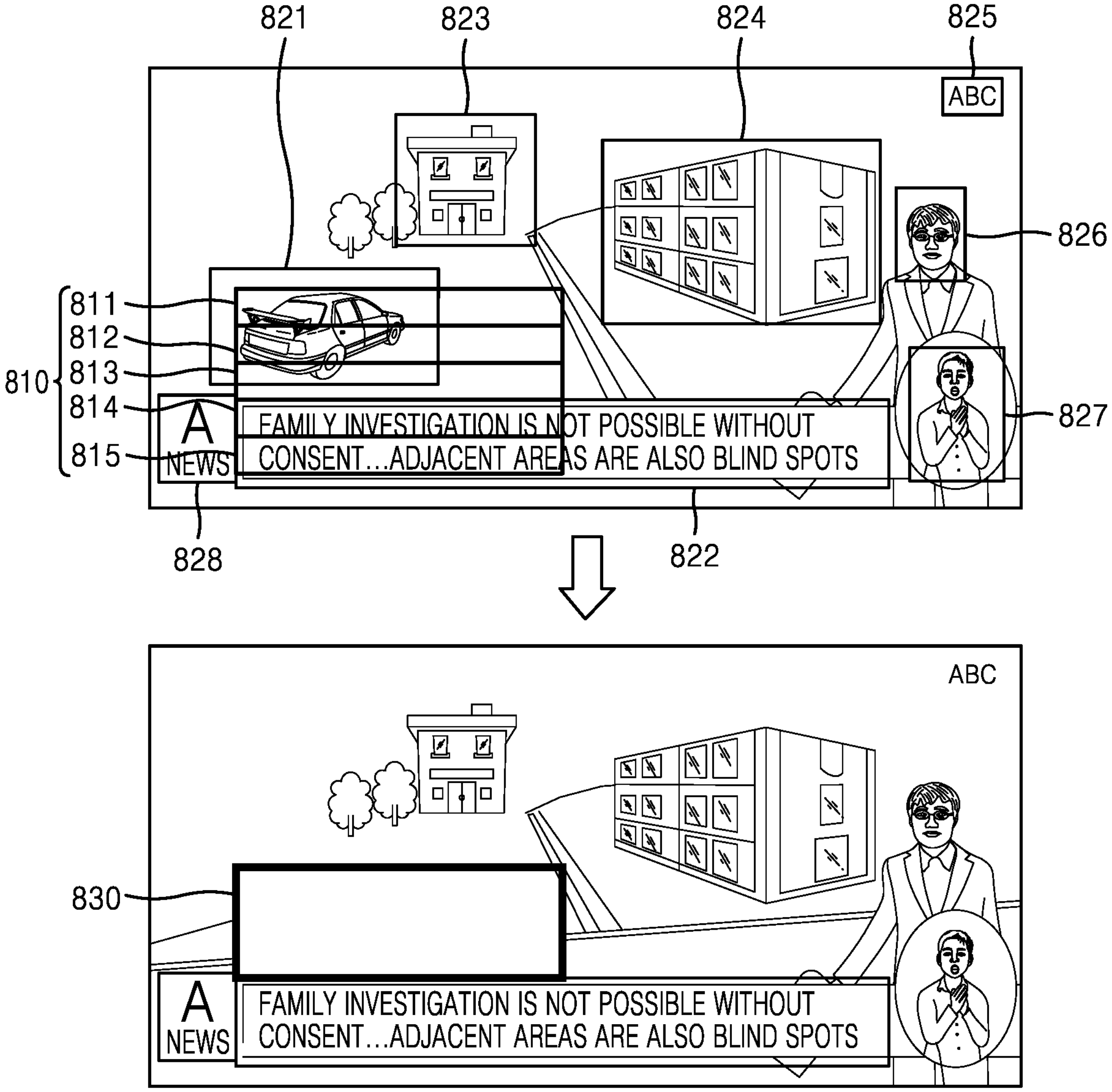
FIG. 8 is a reference diagram for describing an operation in which a display device determines a final output region, according to an embodiment.

FIG. 8 is a reference diagram for describing an operation in which a display device determines a final output region, according to an embodiment.

According to an embodiment, the display device 100 may detect at least one ROI in an image and integrate adjacent ones of the detected ROIs to generate integrated regions. For example, as shown in FIG. 8, a first object region 821, a second object region 822, a third object region 823, a fourth objection region 824, a fifth objection region 825, a sixth object region 826, a seventh object region 827, and an eighth object region 828=may be the detected ROIs or integrated regions.

In addition, as shown in FIG. 8, candidate closed caption regions 810 may include a first candidate region 811, a second candidate region 812, a third candidate region 813, a fourth candidate region 814, and a fifth candidate region 815.

The display device 100 may determine whether each of the first candidate region 811, the second candidate region 812, the third candidate region 813, the fourth candidate region 814, and the fifth candidate region 815 overlaps a detected ROI or integrated region. If all of the first candidate region 811, the second candidate region 812, the third candidate region 813, the fourth candidate region 814, and the fifth candidate region 815 overlap corresponding ROIs or integrated regions as shown in FIG. 8, the display device 100 may determine a final output region so that a closed caption continue to be displayed in a region in which the closed caption was displayed in a previous frame of an image.

In one or more embodiments, the display device 100 may determine a final output region for outputting a closed caption, based on at least one of a size of an overlapping portion, a position of the overlapping portion, and importance of information displayed in the overlapping portion. For example, the display device 100 may determine, based on a size of an overlapping portion, the third candidate region 813 with a smallest overlapping portion as the final output region.

In one or more embodiments, if the display device 100 wishes to determine two regions as the final output region, the display device 100 may select the third candidate region 813 having the smallest overlapping portion, and the second candidate region 812 located lower in the image than the first candidate region 811, among the first candidate region 811 and the second candidate region 812 which each have a smallest overlapping portion next to the third candidate region 813. However, the present disclosure is not limited thereto.

In one or more embodiments, if the first candidate region 811, the second candidate region 812, and the third candidate region 813 overlap the first object region 821 including an object included in a background screen, and the fourth candidate region 814 and the fifth candidate region 815 both overlap the second object region 822 including an open caption in the image, the display device 100 may determine that the importance of information displayed in overlapping portions of the fourth candidate region 814 and the fifth candidate region 815 is higher than the importance of information displayed in overlapping portions of the first candidate region 811, the second candidate region 812, and the third candidate region 813. Accordingly, the display device 100 may determine the first candidate region 811, the second candidate region 812, and the third candidate region 813 as a final output region 830. However, the present disclosure is not limited thereto.

Figure 9:
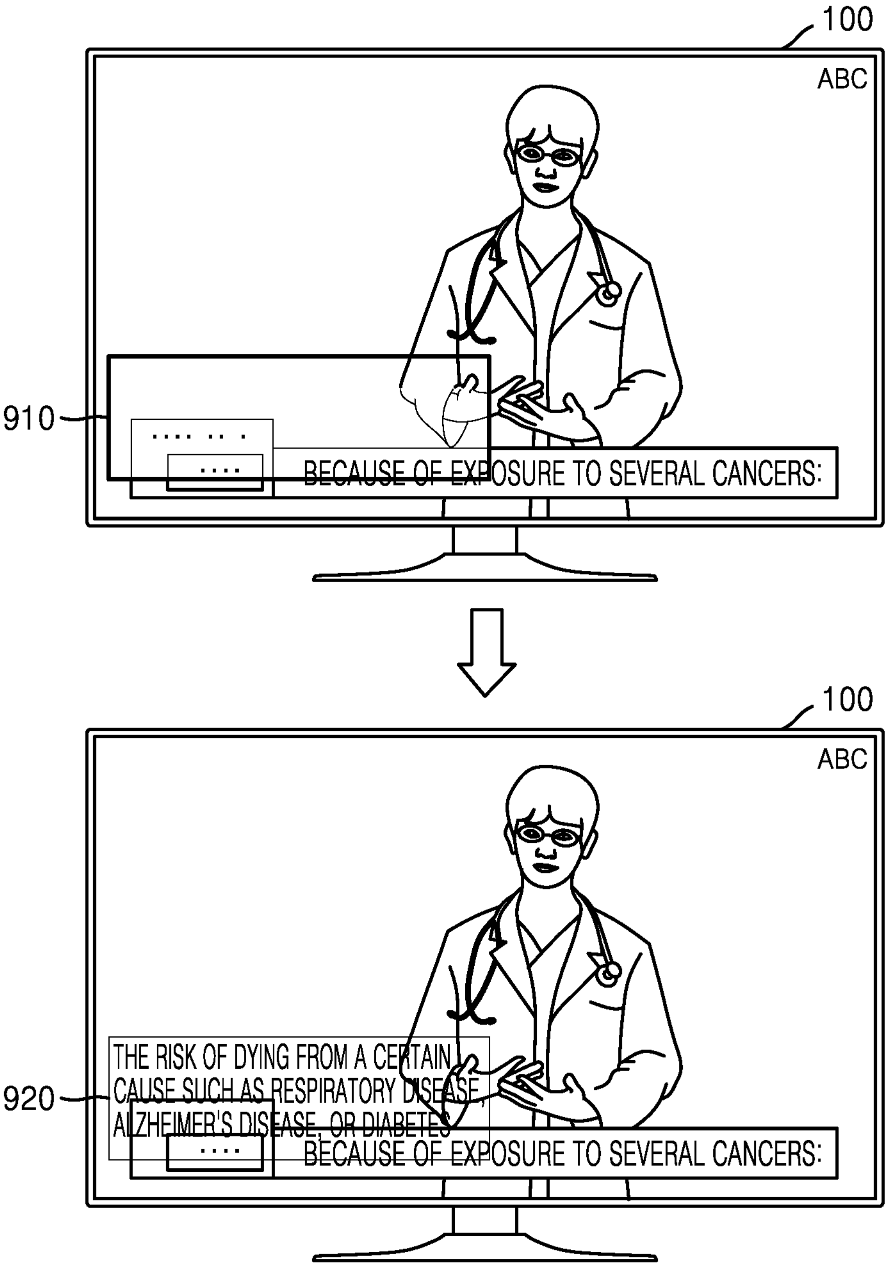
FIG. 9 is a reference diagram for describing an operation of displaying closed captions, according to an embodiment.

FIG. 9 is a reference diagram for describing an operation of displaying closed captions, according to an embodiment.

Referring to FIG. 9, if a final output region 910 for outputting a closed caption overlaps a detected ROI or integrated region, the display device 100 may adjust a text color for the closed caption, transparency of a background of the closed caption, etc.

For example, the display device 100 may display a background 920 of the closed caption transparently. Accordingly, a viewer may recognize information displayed overlapping a region in which the closed caption is displayed. In addition, the display device 100 may also adjust a letter color, a letter size, etc. of the closed caption.

Figure 10:
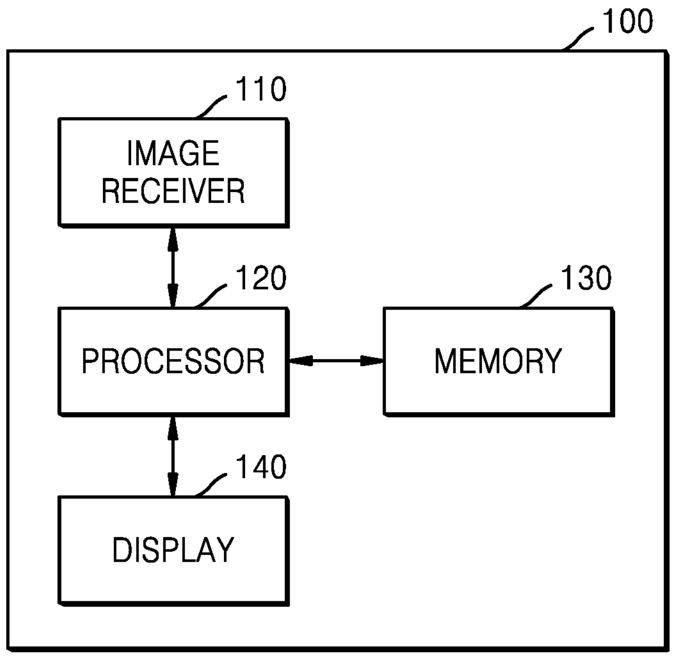
FIG. 10 is a block diagram of a configuration of a display device according to an embodiment.

FIG. 10 is a block diagram of a configuration of a display device according to an embodiment.

Referring to FIG. 10, a display device 100 according to an embodiment may include an image receiver 110, a processor 120, a memory 130, and a display 140.

According to an embodiment, the image receiver 110 may include a communication interface, an input/output (I/O) interface, etc. For example, the communication interface may transmit or receive data or signals to or from an external device or a server. For example, the communication interface may include a Wi-Fi module, a Bluetooth module, an infrared (IR) communication module, a wireless communication module, a local area network (LAN) module, an Ethernet module, a wired communication module, etc. In this case, each communication module may be implemented in the form of at least one hardware chip.

The Wi-Fi module and the Bluetooth module perform communications according to a Wi-Fi method and a Bluetooth method, respectively. When the Wi-Fi module or the Bluetooth module are used, various types of connection information such as a service set identifier (SSID) and a session key may be first transmitted and received, a communication connection may be established using the connection information, and then various types of information may be transmitted and received. The wireless communication module may include at least one communication chip for performing communication according to various communication standards such as ZigBee, 3rd generation (3G), 3rd Generation Partnership Project (3GPP), long-term evolution (LTE), LTE Advanced (LTE-A), 4th generation (4G), 5th generation (5G), etc.

The I/O interface receives video (e.g., a moving image, etc.), audio (e.g., voice, music, etc.), additional information (e.g., an electronic program guide (EPG), etc.), etc. from outside the display device 100. The I/O interface may include one of a high-definition multimedia interface (HDMI), a mobile high-definition link (MHL), a universal serial bus (USB), a display port (DP), a Thunderbolt, a video graphics array (VGA) port, an RGB port, a D-subminiature (D-sub), a digital visual interface (DVI), a component jack, and a PC port.

According to an embodiment, the image receiver 110 may receive one or more images. In this case, the image receiver 110 may receive a closed caption and information about the closed caption (e.g., a display position, size, letters, color, background color, font, etc. of the closed caption).

According to an embodiment, the processor 120 controls all operations of the display device 100 and a flow of signals between the internal components of the display device 100 and performs a function of processing data.

The processor 120 may include a single core, a dual core, a triple core, a quad core, or a number of cores equal to multiples of thereof. Furthermore, the processor 120 may include a plurality of processors. For example, the processor 120 may be implemented as a main processor and a sub processor operating in a sleep mode.

In addition, the processor 120 may include at least one of a central processing unit (CPU), a graphics processing unit (GPU), and a video processing unit (VPU). In one or more embodiments, according to an embodiment, the processor 120 may be implemented as a system on chip (SoC) that integrates at least one of a CPU, a GPU, and a VPU.

According to an embodiment, the memory 130 may store various pieces of data, programs, or applications for driving and controlling the display device 100.

Also, a program stored in memory 130 may include at least one instruction. A program (at least one instruction) or an application stored in the memory 130 may be executed by the processor 120.

According to an embodiment, if the module for performing the automatic closed caption position adjustment function shown in FIG. 3 is configured as a program, the memory 130 may store the automatic closed caption position adjustment function module shown in FIG. 3.

According to an embodiment, the processor 120 may include at least one of the ROI detector 310, the integrated region generator 320, and the closed caption output region determiner 330 shown in FIG. 3. According to an embodiment, the processor 120 may execute at least one instruction of the automatic closed caption position adjustment function module stored in the memory to perform at least one of the functions of the ROI detector 310, the integrated region generator 320, and the closed caption output region determiner 330 of FIG. 3.

According to an embodiment, the processor 120 may determine whether the automatic closed caption position adjustment function is activated. When the automatic closed caption position adjustment function is set to off, the processor 120 may control the closed caption to be output based on a position included in received attribute information about the closed caption. In this case, the position included in the attribute information about the closed caption may be a position set by an external device or an external server that transmitted the closed caption, but is not limited thereto.

On the other hand, when the automatic closed caption position adjustment function is set to on, the processor 120 may control the closed caption to be output at a position that does not obscure an important information region included in an image as much as possible.

When the automatic closed caption position adjustment function is set to on, the processor 120 may detect at least one ROI included in the image. In this case, an ROI is a region containing important information in the image, and may be a region including text, people, objects, etc. The processor 120 may use an object detection network to identify objects included in the image and obtain information about a size, location, etc. of the identified objects. Because a method, performed by the processor 120, of detecting objects included in the image by using the object detection network has been described in detail with reference to FIG. 4, a detailed description thereof will be omitted here.

For example, the processor 120 may detect open caption letters, logo letters, product name information, performers, etc. included in the image as important information, and set one or more regions including the detected important information to be ROIs. However, the present disclosure is not limited thereto.

The processor 120 may group the detected ROIs to generate an integrated region. The processor 120 may integrate adjacent ROIs in the horizontal or vertical direction among the detected ROIs. For example, when a distance between adjacent ROIs in the horizontal direction is less than or equal to a first threshold distance, the processor 120 may integrate the ROIs into a single region. In one or more embodiments, when a distance between adjacent ROIs in the vertical direction is less than or equal to a second threshold distance, the processor 120 may integrate the ROIs into a single region.

The processor 120 may determine a closed caption output region based on whether candidate closed caption regions overlap at least one of the ROIs and the integrated regions.

In this case, one or more candidate closed caption regions may be preset regions. In addition, even when a portion of a candidate closed caption region overlaps an ROI or an integrated region, the processor 120 may determine that the candidate closed caption region overlaps it.

The processor 120 may determine only one of the regions that do not overlap the detected ROIs and the integrated regions to be a final output region, or determine two or more of the regions as the final output region. In this case, when the number of regions that do not overlap the detected ROIs and the integrated regions is greater than the number of regions to be determined as the final output region, the processor 120 may determine the final output region according to priority. The processor 120 may assign a higher priority to regions that are located consecutively or a region located in a lower portion of the image.

On the other hand, when all of the candidate closed caption regions overlap the ROIs or integrated regions, the processor 120 may determine the final output region so that the closed caption continues to be displayed in a region in which the closed caption was displayed in a previous frame of the image. In this case, the processor 120 may determine the final output region for outputting the closed caption, based on at least one of a size of an overlapping portion, a position of the overlapping portion, and the importance of information displayed in the overlapping portion.

According to an embodiment, the display 140 generates a driving signal by converting an image signal, a data signal, an on-screen display (OSD) signal, a control signal, etc. processed by the processor 120. The display 140 may be implemented as a plasma display panel (PDP), a liquid crystal display (LCD), an organic light-emitting diode (OLED) display, a flexible display, or the like, and may also be implemented as a three-dimensional (3D) display. Furthermore, the display 140 may be formed as a touch screen to serve as an input device as well as an output device.

According to an embodiment, the display 140 may display the image, and display the closed caption in the final output region determined by the processor 120. In addition, when the final output region overlaps at least one ROI or integrated region, the display 140 may display the closed caption by adjusting a text color for the closed caption, transparency of a background of the closed caption, etc.

Figure 11:
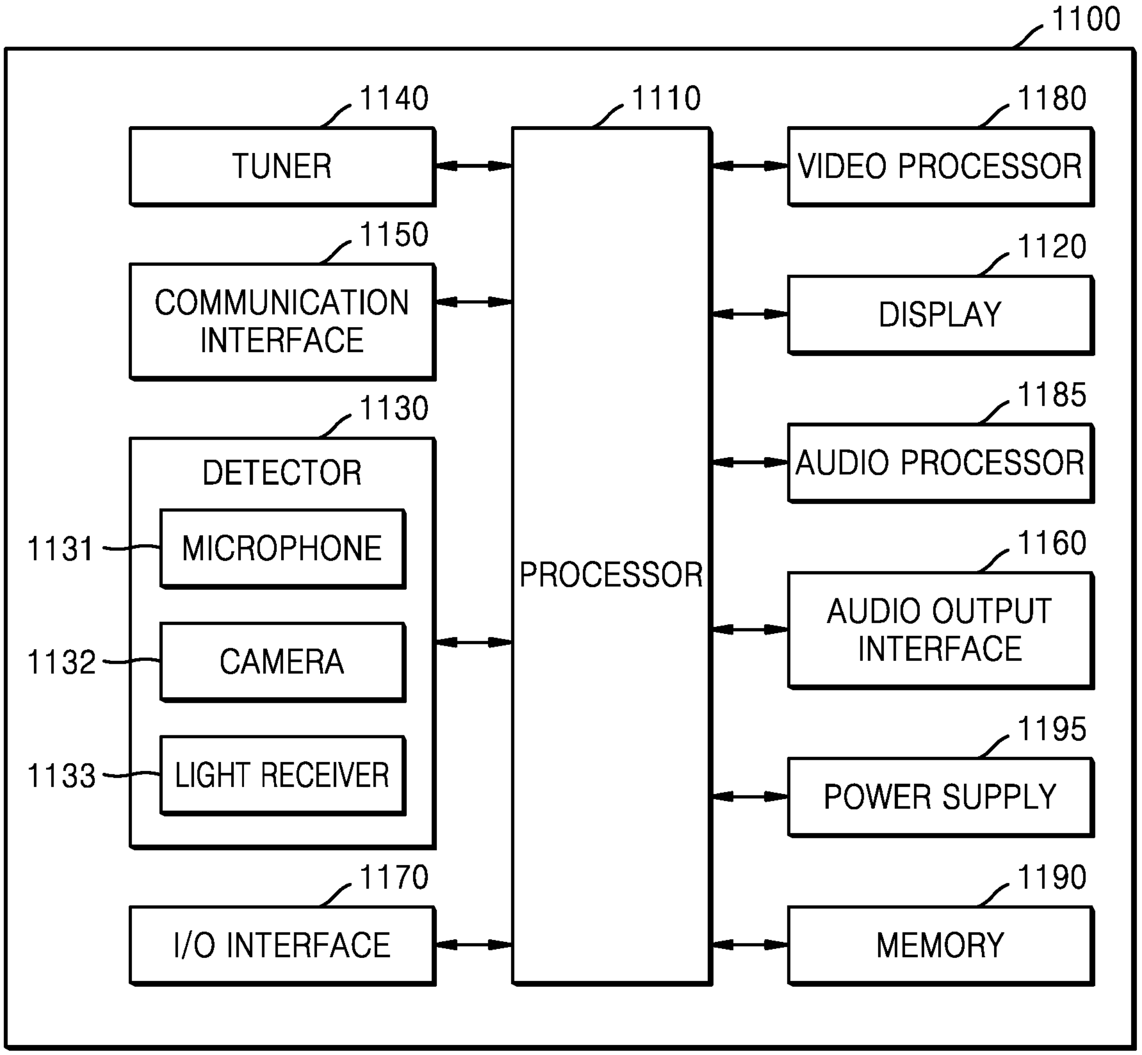
FIG. 11 is a block diagram of a configuration of a display device according to another embodiment.

FIG. 11 is a block diagram of a configuration of a display device according to another embodiment.

Referring to FIG. 11, the display device 1100 of FIG. 11 may be an embodiment of the display device 100 described with reference to FIGS. 1 to 10.

Referring to FIG. 11, the display device 1100 according to an embodiment may include a tuner 1140, a processor 1110, a display 1120, a communication interface 1150, a detector 1130, an I/O interface 1170, a video processor 1180, an audio processor 1185, an audio output interface 1160, a memory 1190, and a power supply 1195.

The tuner 1140, the communication interface 1150, and the I/O interface 1170 of FIG. 11 correspond to the image receiver 110 of FIG. 10, the processor 1110 of FIG. 11 corresponds to the processor 120 of FIG. 10, the memory 1190 of FIG. 11 corresponds to the memory 130 of FIG. 10, and the display 1120 of FIG. 11 corresponds to the display 140 of FIG. 10. Thus, descriptions already provided above are omitted.

According to an embodiment, the tuner 1140 may tune and then select only a frequency of a channel to be received among many radio wave components by performing amplification, mixing, resonance, etc. of a broadcast signal received in a wired or wireless manner. The broadcast signal includes audio, video, and additional information (e.g., an EPG).

The tuner 1140 may receive broadcast signals from various sources such as terrestrial broadcasting, cable broadcasting, satellite broadcasting, Internet broadcasting, etc. The tuner 1140 may receive a broadcast signal from a source such as analog broadcasting, digital broadcasting, or the like.

The detector 1130 detects a user's voice, images, or interactions and may include a microphone 1131, a camera 1132, and a light receiver 1133.

The microphone 1131 may receive a voice uttered by the user. The microphone 1131 may convert the received voice into an electrical signal and output the electrical signal to the processor 1110. The user's voice may include, for example, a voice corresponding to a menu or function of the display device 1100.

The camera 1132 may receive an image (e.g., consecutive frames) corresponding to a user's motion including his or her gesture performed within a recognition range of the camera 1132. The processor 1110 may select a menu displayed on the display device 1100 based on a received motion recognition result or perform control corresponding to the motion recognition result.

The light receiver 1133 receives an optical signal (including a control signal) from an external control device via a light window on a bezel of the display 1120. The light receiver 1133 may receive, from the control device, an optical signal corresponding to a user input (e.g., touching, pressing, touch gesture, voice, or motion). A control signal may be extracted from the received optical signal according to control by the processor 1110.

The processor 1110 controls all operations of the display device 1100 and a flow of signals between the internal components of the display device 1100 and performs a function of processing data. When there is an input by the user, or preset and stored conditions are satisfied, the processor 1110 may execute an operation system (OS) and various applications stored in the memory 1190.

The processor 1110 may include random access memory (RAM) that stores signals or data input from outside the display device 1100 or is used as a storage area corresponding to various operations performed by the display device 1100, read-only memory (ROM) that stores a control program for controlling the display device 1100, and a processor.

The video processor 1180 processes video data received by the display device 1100. The video processor 1180 may perform various types of image processing, such as decoding, scaling, noise removal, frame rate conversion, resolution conversion, etc. on the video data.

The audio processor 1185 processes audio data. The audio processor 1185 may perform various types of processing, such as decoding, amplification, noise removal, etc., on the audio data. Moreover, the audio processor 1185 may include a plurality of audio processing modules to process audio corresponding to a plurality of pieces of content.

The audio output interface 1160 outputs audio contained in a broadcast signal received via the tuner 1140 according to control by the processor 1110. The audio output interface 1160 may output audio (e.g., a voice and a sound) input via the communication interface 1150 or the I/O interface 1170. Furthermore, the audio output interface 1160 may output audio stored in the memory 1190 according to control by the processor 1110. The audio output interface 1160 may include at least one of a speaker, a headphone output terminal, or a Sony/Phillips Digital Interface (S/PDIF) output terminal.

The power supply 1195 supplies, according to control by the processor 1110, power input by an external power source to the internal components of the display device 1100. The power supply 1195 may also supply, according to control by the processor 1110, power output from one or more batteries located within the display device 1100 to the internal components.

The memory 1190 may store various pieces of data, programs, or applications for driving and controlling the display device 1100 according to control by the processor 1110. Although not shown, the memory 1190 may include a broadcasting receiving module, a channel control module, a volume control module, a communication control module, a voice recognition module, a motion recognition module, a light receiving module, a display control module, an audio control module, an external input control module, a power control module, a power control module for an external device connected wirelessly (e.g., via Bluetooth), a voice database (DB), or a motion DB. The modules and DBs of the memory 1190 not shown in FIG. 3 may be implemented in the form of software in order to perform a broadcast reception control function, a channel control function, a volume control function, a communication control function, a voice recognition function, a motion recognition function, a light receiving control function, a display control function, an audio control function, an external input control function, a power control function, or a power control function of the wirelessly (e.g., Bluetooth) connected external device. The processor 1110 may perform the respective functions by using the software stored in the memory 1190.

Moreover, the block diagrams of the display device 100 illustrated in FIG. 10 and the display device 1100 illustrated in FIG. 11 are block diagrams for an embodiment. The components in the block diagrams may be integrated, added, or omitted according to specifications of the display device 100 illustrated in FIG. 10 and the display device 1100 illustrated in FIG. 11 that are actually implemented. In other words, two or more components may be combined into a single component, or a single component may be subdivided into two or more components. Furthermore, functions performed in each block are intended to describe embodiments, and an operation or a device related to the functions does not limit the scope of the present disclosure.

An operation method of a display device according to an embodiment may be implemented in the form of program commands that may be performed by various types of computers, and may be recorded on computer-readable recording media. The computer-readable recording media may include program commands, data files, data structures, etc. either alone or in combination. The program commands recorded on the computer-readable recording media may be designed and configured for the present disclosure or may be known to and be usable by those of ordinary skill in the art of computer software. Examples of the computer-readable recording media include magnetic media such as hard disks, floppy disks, and magnetic tapes, optical media such as compact disk ROM (CD-ROM) and digital versatile disks (DVDs), magneto-optical media such as floptical disks, and hardware devices that are configured to store and perform program commands, such as ROM, RAM, flash memory, etc. Examples of program commands include not only machine code such as that created by a compiler but also high-level language code that may be executed by a computer using an interpreter or the like.

In addition, operation methods of a display device according to embodiments of the disclosure may be included in a computer program product when provided. The computer program product may be traded, as a product, between a seller and a buyer.

The computer program product may include a software program and a computer-readable storage medium having the software program stored thereon. For example, the computer program product may include a product (e.g., a downloadable application) in the form of a software program electronically distributed by a manufacturer of an electronic device or through an electronic market (e.g., Google Play Store™, and App Store™). For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system consisting of a server and a client device, the computer program product may include a storage medium of the server or a storage medium of the client device. In one or more embodiments, in a case in which there is a third device (e.g., a smartphone) communicatively connected to the server or client device, the computer program product may include a storage medium of the third device. In one or more embodiments, the computer program product may include a software program itself that is transmitted from the server to the client device or the third device or that is transmitted from the third device to the client device.

In this case, one of the server, the client device, and the third device may execute the computer program product to perform methods according to embodiments of the disclosure. In one or more embodiments, at least two of the server, the client device, and the third device may execute the computer program product to perform the methods according to the embodiments of the disclosure in a distributed manner.

For example, the server (e.g., a cloud server, an artificial intelligence server, or the like) may execute the computer program product stored therein to control the client device communicatively connected to the server to perform the methods according to the embodiments of the disclosure.

While embodiments have been described above, the embodiments are not to be construed as limiting the scope of the disclosure, and various modifications and improvements made by those of ordinary skill in the art based on a basic concept of the present disclosure also fall within the scope of the present disclosure as defined by the following claims.

What is claimed is:

1. A display device comprising:

a display;

a memory storing at least one instruction; and at least one processor configured to execute the at least one instruction, wherein the at least one instruction, when executed by the at least one processor, causes the display device to:

receive an image and a closed caption corresponding to the image, detect a plurality of regions of interest (ROIs) included in the image by using a neural network, generate at least one integrated region by grouping two or more ROIs of the plurality of ROIs into at least one group of adjacent ROIs based on a first threshold distance or a second threshold distance, wherein the two or more ROIs are selected for inclusion in the at least one group of adjacent ROIs based on a determination that each of the two or more ROIs is adjacent to another ROI among the plurality of ROIs, determine a closed caption output region among at least one preset candidate closed caption region based on whether the at least one preset candidate closed caption region overlaps at least one of the plurality of ROIs or the at least one integrated region, and when a number of preset candidate closed caption regions that do not overlap the plurality of ROIs or the at least one integrated region is greater than a number of regions to be determined as the closed caption output region, determine the closed caption output region according to a priority assigned based on whether preset candidate closed caption regions of the at least one preset candidate closed caption region are located consecutively or located in a lower portion of the image, control the display to display the closed caption in the closed caption output region, wherein based on a distance between a first ROI and a second ROI adjacent in a vertical direction among the plurality of ROIs, being less than or equal to the first threshold distance, integrate the first ROI and the second ROI to generate a first integrated region, wherein based on a distance between the first ROI and a third ROI adjacent in a horizontal direction, among the plurality of ROIs, being less than or equal to the second threshold distance, integrate the first ROI and the third ROI to generate a second integrated region, and wherein the first integrated region includes a region between the first ROI and the second ROI, and the second integrated region includes a region between the first ROI and the third ROI.

2. The display device of claim 1, wherein the at least one instruction, when executed by the at least one processor, further causes the display device to:

determine the closed caption output region based on the at least one preset candidate closed caption region that do not overlap at least one of the plurality of ROIs and the at least one integrated region.

3. The display device of claim 1, wherein the at least one instruction, when executed by the at least one processor, further causes the display device to:

identify at least one object included in the image by using the neural network, and identify the plurality of ROIs by obtaining information about a location and a size of the at least one object.

4. The display device of claim 3, wherein the at least one object comprises at least one of a text, a person, an animal, and an object.

5. The display device of claim 1, wherein the at least one instruction, when executed by the at least one processor, further causes the display device to:

detect the plurality of ROIs based on whether a function for automatically adjusting a display position of the closed caption is activated.

6. The display device of claim 1, wherein the at least one instruction, when executed by the at least one processor, further causes the display device to:

based on the plurality of candidate closed caption regions including a first candidate region, a second candidate region, and a third candidate region, and further based on the first candidate region and the second candidate region being located contiguously and the third candidate region being located separately from the first candidate region and the second candidate region, determine the first candidate region and the second candidate region as the closed caption output region.

7. The display device of claim 1, wherein the at least one instruction, when executed by the at least one processor, further causes the display device to:

based on the plurality of candidate closed caption regions including a first candidate region, a second candidate region, and a third candidate region, and further based on the third candidate region being located below the first candidate region and the second candidate region, determine the third candidate region as the closed caption output region.

8. The display device of claim 1, wherein the at least one instruction, when executed by the at least one processor, further causes the display device to:

based on all of the at least one preset candidate closed caption region overlapping at least one of the plurality of ROIs and the at least one integrated region, determine, as the closed caption output region, a region in which the closed caption was displayed in an image corresponding to a first frame preceding a second frame corresponding to the image.

9. The display device of claim 8, wherein the at least one instruction, when executed by the at least one processor, further causes the display device to:

based on all of the at least one preset candidate closed caption region overlapping at least one of the plurality of ROIs and the at least one integrated region, determine the closed caption output region among the at least one preset candidate closed caption region, based on at least one of a size of a portion of each of the at least one preset candidate closed caption region overlapping at least one of the plurality of ROIs and the at least one integrated region, a position of an overlapping portion, and importance of information displayed in the overlapping portion.

10. The display device of claim 8, wherein the at least one instruction, when executed by the at least one processor, further causes the display device to adjust at least one of a color of the closed caption displayed in the closed caption output region and a transparency of a background of the closed caption.

11. An operation method of a display device, the operation method comprising:

receiving an image and a closed caption corresponding to the image;

detecting a plurality of regions of interest (ROIs) included in the image by using a neural network;

generating at least one integrated region by grouping two or more ROIs of the plurality of ROIs into at least one group of adjacent ROIs based on a first threshold distance or a second threshold distance, wherein the two or more ROIs are selected for inclusion in the at least one group of adjacent ROIs based on a determination that each of the two or more ROIs is adjacent to another ROI among the plurality of ROIs;

determining a closed caption output region among at least one preset candidate closed caption region based on whether the at least one preset candidate closed caption region overlaps at least one of the plurality of ROIs or the at least one integrated region, and when a number of preset candidate closed caption regions that do not overlap the plurality of ROIs or the at least one integrated region is greater than a number of regions to be determined as the closed caption output region, determine the closed caption output region according to a priority assigned based on whether preset candidate closed caption regions of the at least one preset candidate closed caption region are located consecutively or located in a lower portion of the image; and displaying the closed caption in the closed caption output region, wherein the generating of the at least one integrated region comprises:

based on a distance between a first ROI and a second ROI adjacent in a vertical direction, among the plurality of ROIs, being less than or equal to a first threshold distance, generating a first integrated region by integrating the first ROI and the second ROI, and based on a distance between the first ROI and a third ROI adjacent in a horizontal direction, among the plurality of ROIs, being less than or equal to a second threshold distance, generating a second integrated region by integrating the first ROI and the third ROI, and wherein the first integrated region includes a region between the first ROI and the second ROI, and the second integrated region includes a region between the first ROI and the third ROI.

12. A non-transitory computer-readable recording media having stored therein a program, which when executed by at least one processor causes the at least one processor to execute a method of operating a display device, the method comprising:

receiving an image and a closed caption corresponding to the image;

detecting a plurality of regions of interest (ROIs) included in the image by using a neural network;

generating at least one integrated region by grouping two or more ROIs of the plurality of ROIs into at least one group of adjacent ROIs based on a first threshold distance or a second threshold distance, wherein the two or more ROIs are selected for inclusion in the at least one group of adjacent ROIs based on a determination that each of the two or more ROIs is adjacent to another ROI among the plurality of ROIs;

determining a closed caption output region among at least one preset candidate closed caption region based on whether the at least one preset candidate closed caption region overlaps at least one of the plurality of ROIs or the at least one integrated region, and when a number of preset candidate closed caption regions that do not overlap the plurality of ROIs or the at least one integrated region is greater than a number of regions to be determined as the closed caption output region, determine the closed caption output region according to a priority assigned based on whether preset candidate closed caption regions of the at least one preset candidate closed caption region are located consecutively or located in a lower portion of the image; and displaying the closed caption in the closed caption output region, wherein the generating of the at least one integrated region comprises:

based on a distance between a first ROI and a second ROI adjacent in a vertical direction, among the plurality of ROIs, being less than or equal to a first threshold distance, generating a first integrated region by integrating the first ROI and the second ROI, and based on a distance between the first ROI and a third ROI adjacent in a horizontal direction, among the plurality of ROIs, being less than or equal to a second threshold distance, generating a second integrated region by integrating the first ROI and the third ROI, and wherein the first integrated region includes a region between the first ROI and the second ROI, and the second integrated region includes a region between the first ROI and the third ROI.

* * * * *